US010275700B2

(12) United States Patent
Zheng

(10) Patent No.: US 10,275,700 B2
(45) Date of Patent: Apr. 30, 2019

(54) ELECTRONIC TAG DEVICE FOR RAIL TRAFFIC CONCRETE PREFABRICATED PARTS AND USING METHOD THEREOF

(71) Applicant: Beijing Good Fortune Innovative Intelligence Technology Co.Ltd, Beijing (CN)

(72) Inventor: Yi Zheng, Beijing (CN)

(73) Assignee: Beijing Good Fortune Innovative Intelligence Technology Co. Ltd, Beijing (CN)

( * ) Notice: Subject to any disclaimer, the term of this patent is extended or adjusted under 35 U.S.C. 154(b) by 0 days.

(21) Appl. No.: 15/974,660

(22) Filed: May 8, 2018

(65) Prior Publication Data

US 2018/0293481 A1     Oct. 11, 2018

(30) Foreign Application Priority Data

Aug. 23, 2017   (CN) .......................... 2017 1 0730205

(51) Int. Cl.
| | |
|---|---|
| *G06K 7/08* | (2006.01) |
| *G06K 19/077* | (2006.01) |
| *B61L 25/04* | (2006.01) |
| *G06K 19/00* | (2006.01) |
| *B61L 1/20* | (2006.01) |
| *B61L 3/12* | (2006.01) |
| *F16B 21/08* | (2006.01) |

(Continued)

(52) U.S. Cl.
CPC .......... *G06K 19/07728* (2013.01); *B61L 1/20* (2013.01); *B61L 3/125* (2013.01); *B61L 3/126* (2013.01); *B61L 25/04* (2013.01); *B61L 25/048* (2013.01); *F16B 21/088* (2013.01); *G06K 19/005* (2013.01); *G06K 19/02* (2013.01); *G06K 19/04* (2013.01); *G06K 19/0772* (2013.01); *G06K 19/07758* (2013.01)

(58) Field of Classification Search
CPC .... G06K 19/00; G06K 19/005; G06K 19/067; G06K 19/07; G06K 19/077; G06K 19/07728; G06K 19/02; G06K 19/0772; G06K 19/07758; B61L 25/04; B61L 25/043; B61L 25/048; B61L 1/20; B61L 3/125; B61L 3/126; F16B 21/088
See application file for complete search history.

(56) References Cited

U.S. PATENT DOCUMENTS

| | | | | |
|---|---|---|---|---|
| 2001/0048057 | A1* | 12/2001 | Heisler | ............... G09F 3/204 248/220.22 |
| 2003/0156033 | A1* | 8/2003 | Savage | ............... G06K 19/04 340/572.8 |

(Continued)

*Primary Examiner* — Thien M Le
*Assistant Examiner* — April A Taylor

(57) ABSTRACT

An electronic tag device for rail traffic concrete prefabricated parts includes: a steel bracket; wherein the steel bracket is n-shaped and comprises a left foot, a right foot and a beam which are integrated into one body; a rebar clamp made of a metal plate is provided on bottoms of the left foot and the right foot respectively; a tag holder is provided on a top of the beam; a top end of the tag holder has a groove; a metal-resistant electronic tag is place inside the groove; a waterproof end cap is put on the tag holder; an internal shape of the waterproof end cap matches the tag holder; both the waterproof end cap and the tag holder adopt a thermoplastic material.

9 Claims, 3 Drawing Sheets

(51) Int. Cl.
*G06K 19/02* (2006.01)
*G06K 19/04* (2006.01)

(56) References Cited

U.S. PATENT DOCUMENTS

2016/0220330 A1* 8/2016 Lemchen .............. A61C 7/146
2017/0159243 A1* 6/2017 Campman .............. E01B 26/00

* cited by examiner

ELECTRONIC TAG DEVICE FOR RAIL TRAFFIC CONCRETE PREFABRICATED PARTS AND USING METHOD THEREOF

CROSS REFERENCE OF RELATED APPLICATION

The present invention claims priority under 35 U.S.C. 119(a-d) to CN 201710730205.9, filed Aug. 23, 2017.

BACKGROUND OF THE PRESENT INVENTION

Field of Invention

The present invention relates to a technical field of rail traffic, and more particularly to an electronic tag device for rail traffic concrete prefabricated parts and a using method thereof.

Description of Related Arts

China has over 6800 kilometers high-speed rail in operation and is the country has the most complete high-speed rail technology system, the strongest integration power, the longest operating kilometers, the highest speed train and the largest construction scale. With the development of the high-speed rail, the conventional technology is no longer able to meet the needs of railroad electronic informatization. Electronic tag is a non-contact automatic identification technology, which identifies the object and captures the related data through radio frequency signal. The identification requires no manual intervention. The RFID has the advantages of water proof, magnetic proof, high temperature endurance, long service life, long reading range, encryptable, large storage capacity, convenient change of storage information, etc. The encoding, storage and read/write of the electronic tag are different to the conventional identification (bar code) or the handmade identification. The electronic tag is stored on the integrated circuit in a read-only format or read/write format. The read/write of the electronic tag is realized by electronic transmission. RFID is characterized in capability to identify specific object while identifying plural objects at the same time. The bar code is just able to read one by one. The information storage capacity of the electronic tag is large. The data are able to be read from outside of the material by radio frequency. The bar code needs to be read from the surface of the material by laser or infrared.

The precast concrete is widely adopted in railway construction. To combine the rail traffic concrete prefabricated parts with the electronic tag technology lays a solid foundation for the railway electronic informatization, which is convenient for positioning, inspection and replacement. In a reinforced concrete structure, the reinforcement causes a problem of signal interference. Therefore, specially designed devices must be used to fix the electronic tags on the prefabricated parts to prevent interference. Conventionally, most of the electronic tags are fixed on the external surface of the prefabricated parts, and there are some electronic tag devices that are embedded in the prefabricated parts. However, the conventional electronic tag has a simple structure and low strength, which is unable to bear the various force applied on during concrete pouring, which is easily shifted and unable to be fixed on a specified position. The railway construction requires electronic tag with high accuracy and standardization. The conventional electronic tag is unable to meet the requirements and be adopted in the production of railway precast concrete. A new type of electronic tag needs to be developed.

SUMMARY OF THE PRESENT INVENTION

An object of the present invention is to provide an electronic tag device for pre-embedded rail traffic concrete prefabricated parts to solve the problem of life cycle management thereof. The electronic tag device according to the present invention is placed in the mold while concrete pouring. The electronic tag device is integrated with the prefabricated part after the concrete pouring.

Accordingly, in order to accomplish the above objects, the present invention provides:

an electronic tag device for rail traffic concrete prefabricated parts, comprising: a steel bracket; wherein the steel bracket is n-shaped and comprises a left foot, a right foot and a beam which are integrated into one body; a rebar clamp made of a metal plate is provided on bottoms of the left foot and the right foot respectively; a tag holder is provided on a top of the beam; a top end of the tag holder has a groove; a metal-resistant electronic tag is place inside the groove; a waterproof end cap is put on the tag holder; an internal shape of the waterproof end cap matches the tag holder; both the waterproof end cap and the tag holder adopt a thermoplastic material.

Preferably, there are pressure relief holes on the beam of the steel bracket.

Preferably, two coils of ultrasonic lines are placed at an internal top of the waterproof end cap.

Preferably, there are release-proof clasps on an external wall of the waterproof end cap.

Preferably, the release-proof clasps are trigonal pyramidal bulges.

Preferably, a fixer is integrally formed at a bottom of the tag holder; a fixing hole is drilled on the beam of the steel bracket; the fixer is inserted into the fixing hole for fixing the tag holder on the beam.

Preferably, a fixing slot is opened on the fixer at the bottom of the tag holder, a fixing block matching the fixing slot is integrally formed on the fixing hole.

Preferably, a side fixing board is downwardly and integrally formed at a side of the beam of the steel bracket, and a side fixing hole is drilled on the side fixing board.

A using method of an electronic tag device for rail traffic concrete prefabricated parts is disclosed, comprising steps of:

1) checking whether a metal-resistance electronic tag responds normally; if not, replacing the metal-resistance electronic tag;

2) placing the metal-resistance electronic tag in a groove, and fixing a tag holder on the beam or a side fixing board according to a condition of the rail traffic concrete prefabricated parts;

3) tightly capping a waterproof end cap with the tag holder; thermo-bonding the waterproof end cap with the tag holder by an ultrasonic welding machine;

4) placing a rebar frame in a mold of the rail traffic concrete prefabricated parts, then fixing a steel bracket on the rebar frame by two rebar clamps; and 5) pouring concrete into the mold of the rail traffic concrete prefabricated parts until a top end of the waterproof end cap is level with a surface of the rail traffic concrete prefabricated parts; obtaining an end product of the rail traffic concrete prefabricated parts after pouring.

Compared with the conventional technology, the present invention has advantages as follows.

The electronic tag device according to the present invention is used for life cycle management of rail traffic concrete prefabricated parts. The electronic tag is a pre-embedment device, which is fixed on the rebar frame of the precast ware while installation. The present invention adapts to the features and producing method of the rail traffic concrete prefabricated parts, which is able to be widely applied and is better than conventional electronic tag for concrete prefabricated parts. The present invention adopts the steel bracket and the metal-resistance electronic tag, so as to provided higher performance. The present invention can be used in the precast box-girder bridge of the high-speed railway, the precast concrete beam of the high-speed railway, the double-block sleeper, class III track plate, class III board, precast shielding segment of the subway, precast shielding segment, etc. The electronic tag device can be flexibly installed on the top or side. The electronic tag device adopts split tag holder and waterproof end cap, which is able to replace the fault electronic tag. The waterproof end cap is bonded with the tag holder by ultrasound and assembly of the device is convenient. The designs of elements such as the pressure relief holes and the rebar clamps are able to effectively prevent jitter of the device caused by uneven pressure and shaking during concrete pouring and ensure the electronic tag is accurately fixed on the designated position.

DETAILED DESCRIPTION OF THE PREFERRED EMBODIMENT

Figure 1:
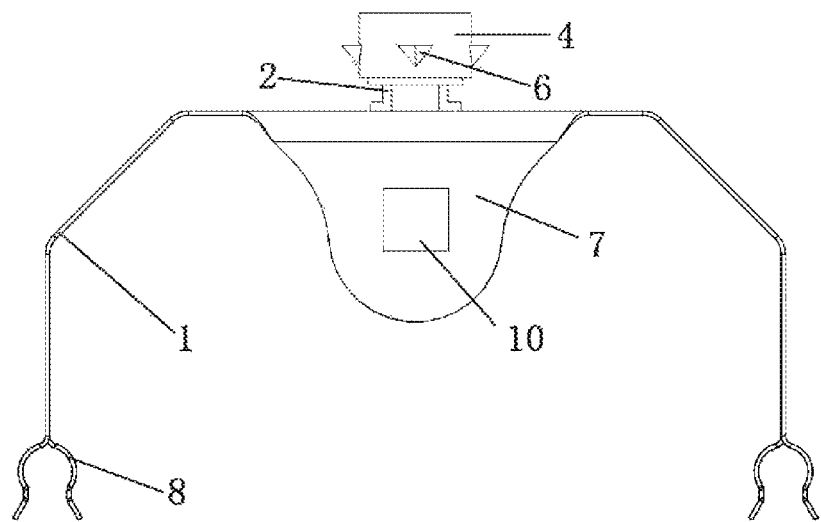
FIG. 1 is a front view of an embodiment 1 of the present invention.
Figure 2:
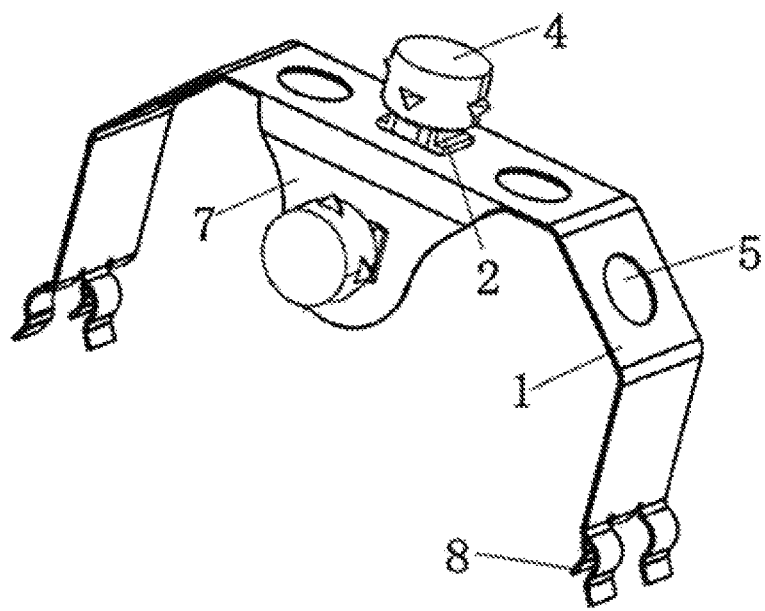
FIG. 2 is a perspective view of the embodiment 1 (for showing a tag holder installation state, 2 tag holders are illustrated while only one is used in practice).
Figure 3:
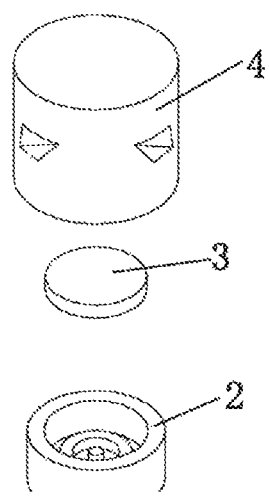
FIG. 3 illustrates installation of a metal-resistant electronic tag.
Figure 6:
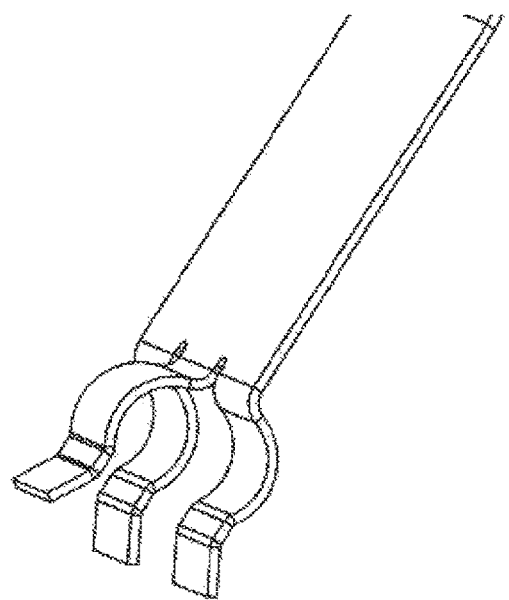
FIG. 6 is an enlarged view of a rebar clamp.

Referring to FIGS. 1 and 2, an electronic tag device for rail traffic concrete prefabricated parts is illustrated, comprising: a steel bracket 1; wherein the steel bracket 1 is n-shaped and comprises a left foot, a right foot and a beam which are integrated into one body. There are pressure relief holes 5 on the beam of the steel bracket 1, in such a manner that concrete flows through the pressure relief holes 5 to balance concrete pressures at both bracket sides for stabilizing. A rebar clamp 8 (shown in FIG. 6) made of a metal plate is provided on bottoms of the left foot and the right foot respectively, which is locked on a rebar frame of the prefabricated parts. A tag holder 2 is provided on a top of the beam; a top end of the tag holder has a groove; a metal-resistant electronic tag 3 is place inside the groove. With the steel bracket 1, the metal-resistant electronic tag 3 has a better performance. A waterproof end cap 4 is put on the tag holder 2; an internal shape of the waterproof end cap 4 matches the tag holder 2 (FIG. 3 illustrates installation of a metal-resistant electronic tag). There are release-proof clasps 6 on an external wall of the waterproof end cap 4, and the release-proof clasps 6 are trigonal pyramidal bulges. Both the waterproof end cap 4 and the tag holder 2 adopt a thermoplastic material. Two coils of ultrasonic lines are placed at an internal top of the waterproof end cap 4 for ultrasound bonding. A side fixing board 7 is downwardly and integrally formed at a side of the beam of the steel bracket 1, and a side fixing hole 10 is drilled on the side fixing board 7.

Figure 4:
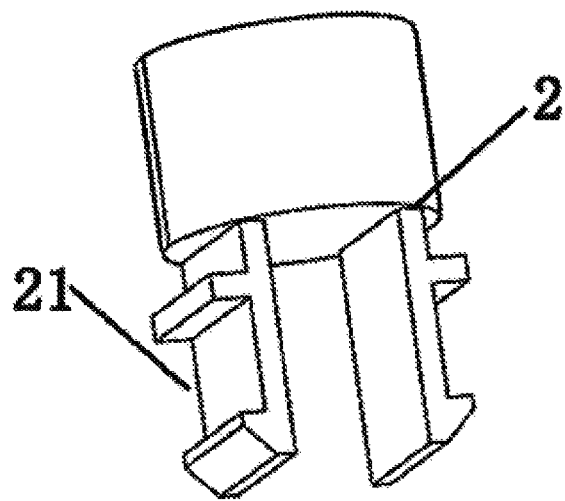
FIG. 4 is an enlarged view of the tag holder.
Figure 5:
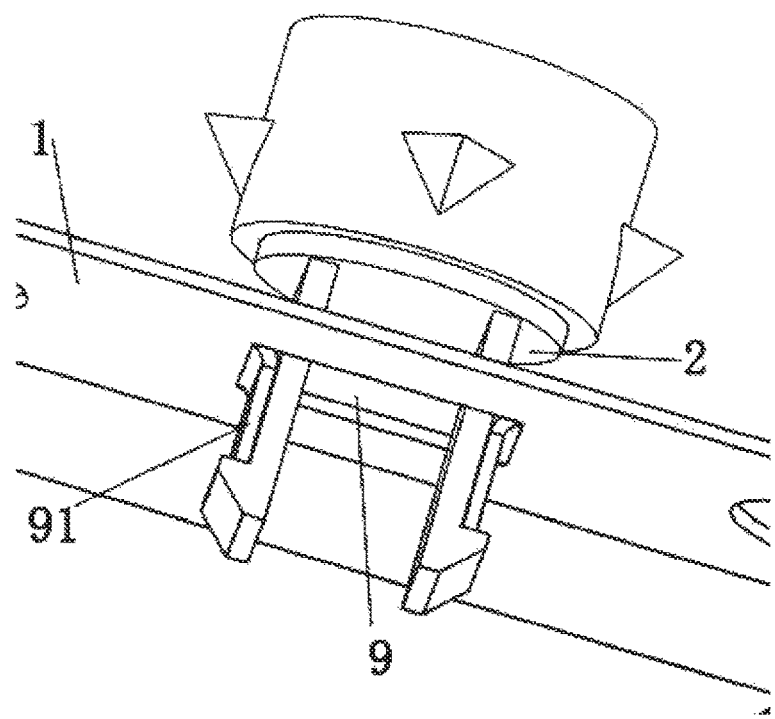
FIG. 5 illustrates installation of the tag holder.

Referring to FIGS. 4 and 5, the tag holder 2 is fixed by a fixer. The fixer is integrally formed at a bottom of the tag holder 2 and a fixing slot 21 is opened on the fixer. A fixing hole 9 is drilled on the beam of the steel bracket 1, and a fixing block 91 matching the fixing slot 21 is integrally formed on the fixing hole 9. The fixer is inserted into the fixing hole 9 for fixing the tag holder 2 on the beam.

In use, the tag holder 2 can be inserted into the fixing hole 9 on the beam, or can be inserted into the side fixing hole 10 on the side fixing board 7, which can be flexibly selected based on the prefabricated parts.

A using method of an electronic tag device for rail traffic concrete prefabricated parts is disclosed, comprising steps of:

1) checking whether a metal-resistance electronic tag responds normally; if not, replacing the metal-resistance electronic tag;

2) placing the metal-resistance electronic tag in a groove, and fixing a tag holder on the beam or a side fixing board according to a condition of the rail traffic concrete prefabricated parts;

3) tightly capping a waterproof end cap with the tag holder; thermo-bonding the waterproof end cap with the tag holder by an ultrasonic welding machine;

4) placing a rebar frame in a mold of the rail traffic concrete prefabricated parts, then fixing a steel bracket on the rebar frame by two rebar clamps; and 5) pouring concrete into the mold of the rail traffic concrete prefabricated parts until a top end of the waterproof end cap is level with a surface of the rail traffic concrete prefabricated parts; obtaining an end product of the rail traffic concrete prefabricated parts after pouring.

One skilled in the art will understand that the embodiment of the present invention as shown in the drawings and described above is exemplary only and not intended to be limiting. Any minor modifications and alterations based on present invention are within the protection range of the present invention.

What is claimed is:

1. An electronic tag device for rail traffic concrete prefabricated parts, comprising: a steel bracket; wherein the steel bracket is n-shaped and comprises a left foot, a right foot and a beam which are integrated into one body; a rebar clamp made of a metal plate is provided on bottoms of the left foot and the right foot respectively; a tag holder is provided on a top of the beam; a top end of the tag holder has a groove; a metal-resistant electronic tag is place inside the groove; a waterproof end cap is put on the tag holder; an internal shape of the waterproof end cap matches the tag holder; both the waterproof end cap and the tag holder adopt a thermoplastic material.

2. The electronic tag device, as recited in claim 1, wherein there are pressure relief holes on the beam of the steel bracket.

3. The electronic tag device, as recited in claim 1, wherein two coils of ultrasonic lines are placed at an internal top of the waterproof end cap.

4. The electronic tag device, as recited in claim 1, wherein there are release-proof clasps on an external wall of the waterproof end cap.

5. The electronic tag device, as recited in claim 4, wherein the release-proof clasps are trigonal pyramidal bulges.

6. The electronic tag device, as recited in claim 1, wherein a fixer is integrally formed at a bottom of the tag holder; a fixing hole is drilled on the beam of the steel bracket; the fixer is inserted into the fixing hole for fixing the tag holder on the beam.

7. The electronic tag device, as recited in claim 6, wherein a fixing slot is opened on the fixer at the bottom of the tag holder, a fixing block matching the fixing slot is integrally formed on the fixing hole.

8. The electronic tag device, as recited in claim 1, wherein a side fixing board is downwardly and integrally formed at a side of the beam of the steel bracket, and a side fixing hole is drilled on the side fixing board.

9. A using method of an electronic tag device for rail traffic concrete prefabricated parts, comprising steps of:
   1) checking whether a metal-resistance electronic tag responds normally; if not, replacing the metal-resistance electronic tag;
   2) placing the metal-resistance electronic tag in a groove, and fixing a tag holder on a beam or a side fixing board according to a condition of the rail traffic concrete prefabricated parts;
   3) tightly capping a waterproof end cap with the tag holder; thermo-bonding the waterproof end cap with the tag holder by an ultrasonic welding machine;
   4) placing a rebar frame in a mold of the rail traffic concrete prefabricated parts, then fixing a steel bracket on the rebar frame by two rebar clamps; and
   5) pouring concrete into the mold of the rail traffic concrete prefabricated parts until a top end of the waterproof end cap is level with a surface of the rail traffic concrete prefabricated parts; obtaining an end product of the rail traffic concrete prefabricated parts after pouring.

* * * * *